May 19, 1931.  J. L. PIVAK  1,806,366
ADJUSTABLE COVER FOR COCKPITS
Filed Aug. 11, 1930   2 Sheets-Sheet 1
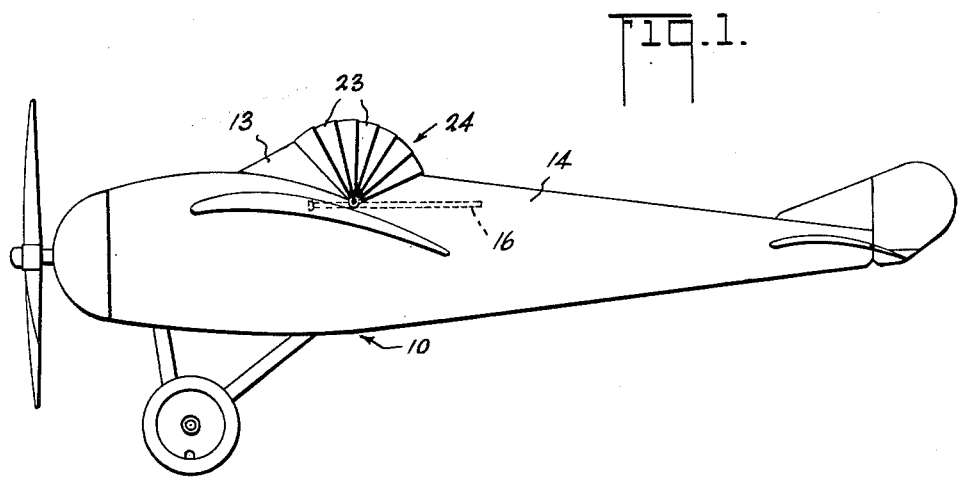
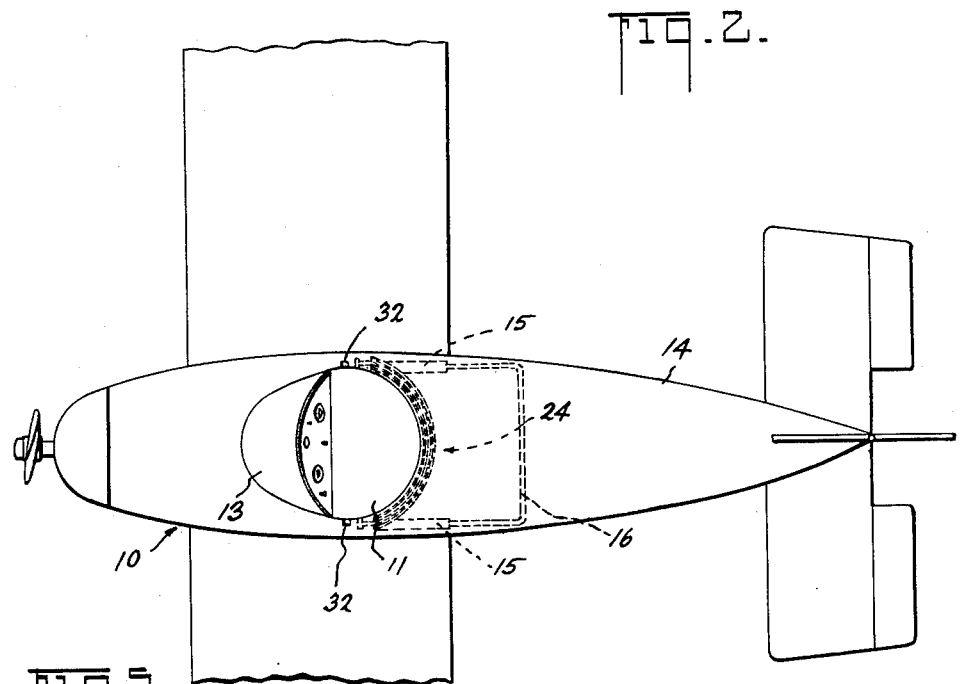
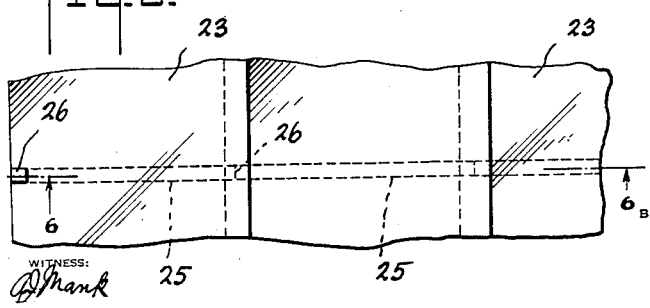
JOEL L. PIVAK
INVENTOR
BY Victor J. Evans
ATTORNEY

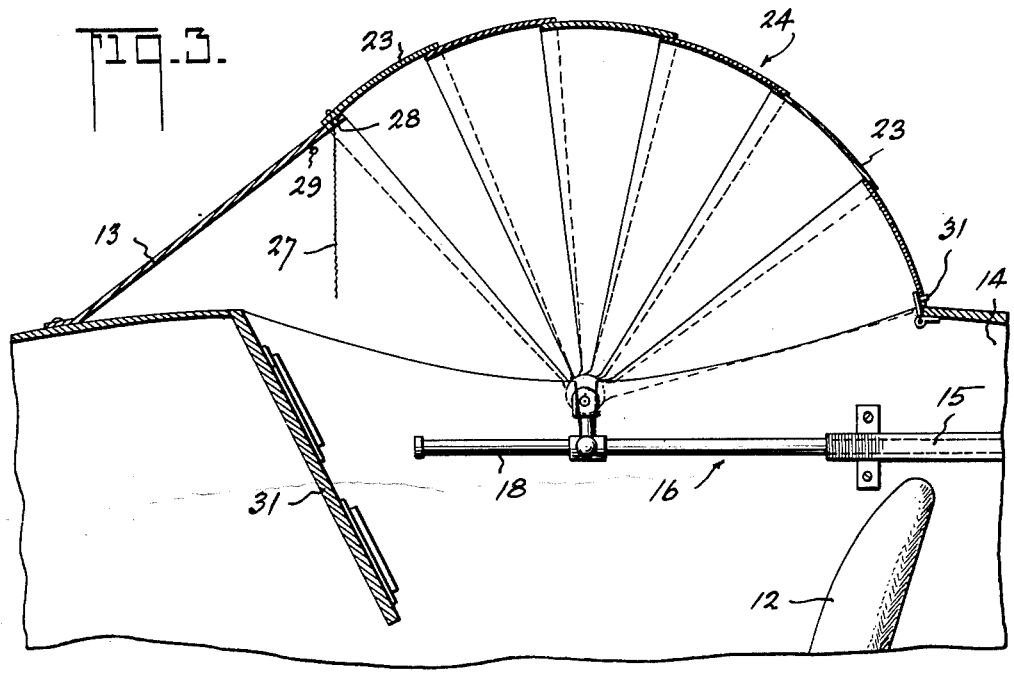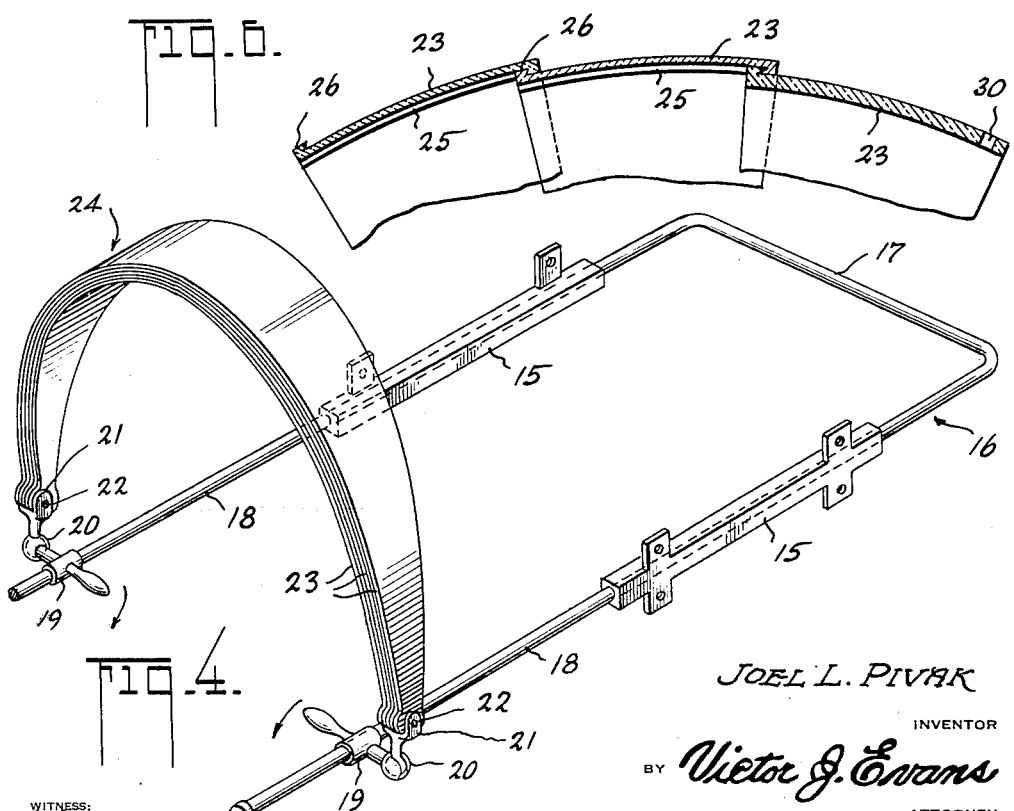

Patented May 19, 1931

1,806,366

UNITED STATES PATENT OFFICE

JOEL L. PIVAK, OF NEW YORK, N. Y.

ADJUSTABLE COVER FOR COCKPITS

Application filed August 11, 1930. Serial No. 474,518.

This invention relates to adjustable covers for cockpits of either land, water or air vehicles, and particularly to open airplane cockpits.

One of the objects of this invention is to provide a collapsible hood, adapted to coact with an existing windshield and the headrest or rear portion of the cockpit when it is desired to cover the open cockpit so as to protect the occupant of the cockpit seat against wind or unfavorable weather, and to collapse the cover and secure it within the body of the vehicle when not in use.

Another object of this invention is to provide a telescoping support for the hood of this device which will readily permit the disappearance of the collapsed hood behind the seat of the cockpit.

Another object of the invention is to provide adjustable hood supporting means which will permit the spreading of the collapsible hood over the cockpit opening when in use, and to swing the ends of the collapsed hood together when the latter is to be removed and secured within the body of the vehicle.

The foregoing and further objects will be more fully apparent from the following description and the accompanying drawing forming part of my disclosure, but in no sense intended to limit the same to the specific illustrations thereof.

Referring to the drawings:

Fig. 1 is a side elevation of an airplane equipped with my collapsible hood in its spread or protecting position.

Fig. 2 is a top view of an airplane showing my collapsible hood drawn rearwards into the body of the plane.

Fig. 3 is a cross sectional view through a portion of a cockpit showing my collapsible hood in its operative position.

Fig. 4 illustrates a perspective detail view of the construction of the adjustable cover.

Fig. 5 is a partial top view showing the interlocking arrangement of the leaves of the cockpit cover; and Fig. 6 is a transverse cross-sectional view through an expanded portion of the collapsible cockpit cover illustrating the interlocking arrangement of the leaves.

Referring to the figures, numeral 10 denotes a fuselage of an airplane provided with a cockpit 11, within which is provided a seat indicated in Fig. 3 at 12. The front portion of the cockpit is preferably equipped with a windshield 13 intended for normal protection of the pilot against wind.

Within the rear portion 14 of the body, there will be seen provided a pair of supports 15, clearly illustrated in Fig. 4, which are attached to the inner walls of the body behind the seat of the cockpit. These supports are preferably hollow so as to accommodate either a tubular or solid frame 16, the rear end of which 17 forms a connection for the telescoping side arms 18 of the frame, which are open at the front. At the open ends of the frame there will be seen secured thereto handle equipped hood supports 19, which are arranged to swing into position shown in Fig. 4 or into position indicated in Fig. 2, in which latter case the handles are turned downwards while the outer extensions of the attaching members 19 are pointing upwards. The ends of attaching members 19 are provided with a ball hinge 20, from which extend holders 21 provided with a pivot 22, passing through the ends of a plurality of interlocking leaves 23 of collapsible hood member 24. The leaves are made preferably of transparent material as, for instance, celluloid pyrolin, and are so arranged as to interlock with each other so that when the cover is in its expanded position, as shown in Fig. 3, the end edges of the leaves are not able to operate. This is accomplished by means of central slots indicated at 25, in which move dovetail extensions 26 as clearly seen in Figs. 5 and 6. At the front edge of the front end leaf there is provided a string or cord indicated at 27, which is adapted to pass through an opening 28 provided at the edge of the windshield 13. In order to fasten cord 27 in place and thereby securing the front leaf of the hood against the edge of the windshield 13, cord 27 may be wound around or clipped by a cord attaching member 29.

The rear edge of the rear end leaf of my hood is provided with an aperture 30, which is adapted to be engaged by a spring controlled pawl 31, shown in Fig. 3.

The operation of my device is extremely simple. When it is desired to cover the cockpit, frame 16 is pulled forwards until the now upwardly directed hood supporting members reach a position between seat 12 and the instrument board 31 of the cockpit, at which position the handles of hood attaching member 19 are swung upwards or inwards whereby the ball joints 20 engage recesses 32, provided within the cockpit indicated in Fig. 2, thereby locking the telescoping frame 16 in position and against movement by turning the attaching member 19 into the aforesaid position. The leaves 23 of the hood 24 are spread at their pivotal point 21, in which spread position the leaves are now unfolded to engage the open edges of the cockpit.

The rear end leaf of the hood is engaged by pawl 31 and by pulling cord 27 forwards and passing it through hole 28 of the windshield, the front edge of the hood engages the windshield edge thereby completing the closure for the cockpit.

When it is desired to dispense with the cover, cord 27 is unfastened, the hood is collapsed, the rear leaf is detached from pawl 31 and the hood supports are swung upwards, whereby the handles assume a downward position. By thus swinging the supports upwardly, the hood supports are disengaged from recesses 32 and the hood itself is narrowed to a shape permitting its folding over on frame or carrier 16, permitting the latter together with the collapsed hood to be pushed behind the seat into the body of the airplane.

The present adjustable cockpit cover is quickly and easily adjustable to operative or inoperative position when the airplane is in flight as well as prior to starting or after landing. Also the transparent material of which the cover is formed enables the pilot to obtain a clear view in all directions at all times.

The hereinbefore described construction admits of considerable modification without departing from the invention; therefore, it is the wish not to be limited to the precise arrangements shown and described, which are as aforesaid, by way of illustration merely. In other words the scope of protection contemplated is to be taken solely from the appended claims, interpreted as broadly as is consistent with the prior art.

What I claim as new is:

1. A cockpit protector, comprising in combination a collapsible hood, a hood carrier, carrier supporting and guide means, adapted to be secured to the interior of the cockpit of a vehicle, said hood carrier in slidable engagement with said supporting and guide means and adapted to be adjustable relative to the latter.

2. The combination with a cockpit of a vehicle, of a cockpit protector, comprising a collapsible transparent hood or cover member, a hood carrier to which said member is secured, a carrier support attached within said cockpit and constituting a guide for said carrier, the latter in slidable engagement with said support and adapted to be adjustable within and relative to said cockpit.

3. The combination with a cockpit of a vehicle, of a bodily adjustable cockpit protector, comprising a hood member composed of a plurality of collapsible transparent blades or sections in interlocking arrangement with each other, a hood carrier adjustably mounted within said cockpit and adapted to support said hood, a carrier support secured at the interior of said cockpit and provided with means for telescopingly engaging said carrier.

4. The combination with a cockpit of a vehicle provided with an operator's seat, of an adjustable, disappearing cockpit cover adapted to protect the occupant of the seat against wind and unfavorable weather, and comprising cover supporting means arranged rearwards of said seat, within the cockpit, a hood carrier in telescoping engagement with said supporting means, a hood hingedly supported by and connected with said carrier, said hood comprising a plurality of nested, arcuated, transparent sections pivoted at their opposite ends, which latter are secured to said carrier, said sections provided with edge interlocking means for facilitating the opening or spreading movement of said hood and at the same time limiting the movement of the sections.

5. The combination with an open cockpit of a vehicle having an operator's or passenger's seat in the cockpit, or an adjustable disappearing cockpit protector comprising a protector mounting secured to the interior of the vehicle body behind the seat, a hood carrier in telescoping engagement with said mounting and comprising a one piece frame slidable rearwards of the seat, hood attachments secured to said carrier and provided with operating means whereby the carrier may be placed either into spread and operative or reduced and disappearing positions, a collapsible hood hingedly connected with said hood attachments and adapted to either cover the cockpit when spread and for use, or to disappear within the vehicle body behind the seat when reduced in width and folded, said hood comprising a nest of interconnected, transparent, arcuated leaves or sections pivotally secured at their ends with said operative attachment secured to said carrier, the ends of said leaves provided with locking means adapted to limit the spreading movement of the hood.

6. In a cockpit protector as per claim 5, said hood having front and rear end leaves, operating means provided with a front leaf for pulling open or collapsing the hood, the outer edges of said end leaves adapted to engage and overlap the edges of the cockpit windshield, the headrest and side edges of the cockpit when the hood is in operative, spread position.

7. A disappearing cockpit cover for vehicles, comprising in combination a double carrier mounting adapted to be secured to the interior of the vehicle body behind the seat of the cockpit, a cover carrier in telescoping engagment with and slidable in said double mounting and comprising a rigid frame open at one end, the latter end adapted to project into the cockpit when the cover is to be used, swingable cover attachments provided with the open end of said carrier and equipped with operating handles, a collapsible cover pivotally connected with said attachments and comprising a nest of interconnected segmental, arcuated, transparent leaves interhinged at their tapering ends, the edges of said leaves provided with movement limiting means, the outer edges of the end leaves of the cover adapted, when the latter is in use, to overlap the edges of the cockpit, the front leaf of the cover provided with means for spreading or collapsing said leaves, said cover adapted to fold in its collapsed form against the carrier so as to facilitate its movement together with the latter into disappearing position behind the seat and within the body of the vehicle.

8. The combination with a cockpit of a vehicle, of a disappearing cockpit cover comprising a double mounting secured to the interior of the vehicle body, a cover carrier supported by and in telescoping engagement with said mounting, a pair of cover supports associated with said carrier and comprising handle equipped members swingably mounted in said carrier and having cover engaging extensions adapted to swing outwards when the cover is to be brought into operative position, a pair of extension rests or recesses provided in the cockpit and adapted to engage and prevent the movement of said cover supports, a cover pivotally associated with said supports and consisting of a nest of end interlocking transparent and resilient leaves adapted to be either spread or drawn together by the outward or inward operations of said cover supports, the front leaf of the cover provided with means for unfolding the leaves and for facilitating their attachment to the front edge of the cockpit, the rear leaf provided with means for securing it to the rear edge of the cockpit, said cover adapted, when folded and drawn together by said cover supports, to swing over and rest upon the carrier preparatory to being moved, together with the latter, into the body of the vehicle.

In testimony whereof I hereby affix my signature.

JOEL L. PIVAK.